United States Patent [19]

Robieux et al.

[11] Patent Number: 4,611,917
[45] Date of Patent: Sep. 16, 1986

[54] OPTICAL SYSTEM FOR DETERMINING AN OBJECT'S POSITION

[75] Inventors: Jean Robieux, Chatenay Malabry; Jean Cornillault, Nozay; Antoine Bettinger, Janville sur Juine, all of France

[73] Assignee: Compagnie Generale d'Electricite, France

[21] Appl. No.: 629,020

[22] Filed: Jul. 9, 1984

[30] Foreign Application Priority Data

Jul. 8, 1983 [FR] France ............................... 83 11423

[51] Int. Cl.⁴ ........................ G01B 11/14; G01B 11/24
[52] U.S. Cl. .................................. 356/37 S; 356/376
[58] Field of Search ............................... 356/375, 376

[56] References Cited

U.S. PATENT DOCUMENTS

| | | | |
|---|---|---|---|
| 3,481,672 | 12/1969 | Zoot .................................... | 356/375 |
| 3,977,789 | 8/1976 | Hunter et al. ....................... | 356/376 |
| 4,322,978 | 4/1982 | Fromm ................................ | 356/376 |
| 4,526,471 | 7/1985 | Bykov et al. ........................ | 356/375 |
| 4,534,650 | 8/1985 | Clerget et al. ...................... | 356/376 |

FOREIGN PATENT DOCUMENTS 1163289  9/1958  France .

OTHER PUBLICATIONS

Applied Physics Letters, vol. 42, No. 8, Apr. 15, 1983, N.Y., U.S.A.

Primary Examiner—R. A. Rosenberger
Assistant Examiner—Crystal Cooper
Attorney, Agent, or Firm—Sughrue, Mion, Zinn, Macpeak, and Seas

[57] ABSTRACT

Optical system having application to robotics for determining an object's position. The present system consisting of a laser generator 1 with, devices 11 modulating the wavelength of laser generator frequency along an ascending ramp. An optical system 8 for concentrating radiation near the object, receiver 16 picks up a luminous signal transmitted by the object 10 and reflected on to an optical lamp 6. A processing circuit 17 measures the time in which elapses between the beginning of the shift in wavelength and the moment when the luminous signal is picked up by the receiver.

7 Claims, 5 Drawing Figures

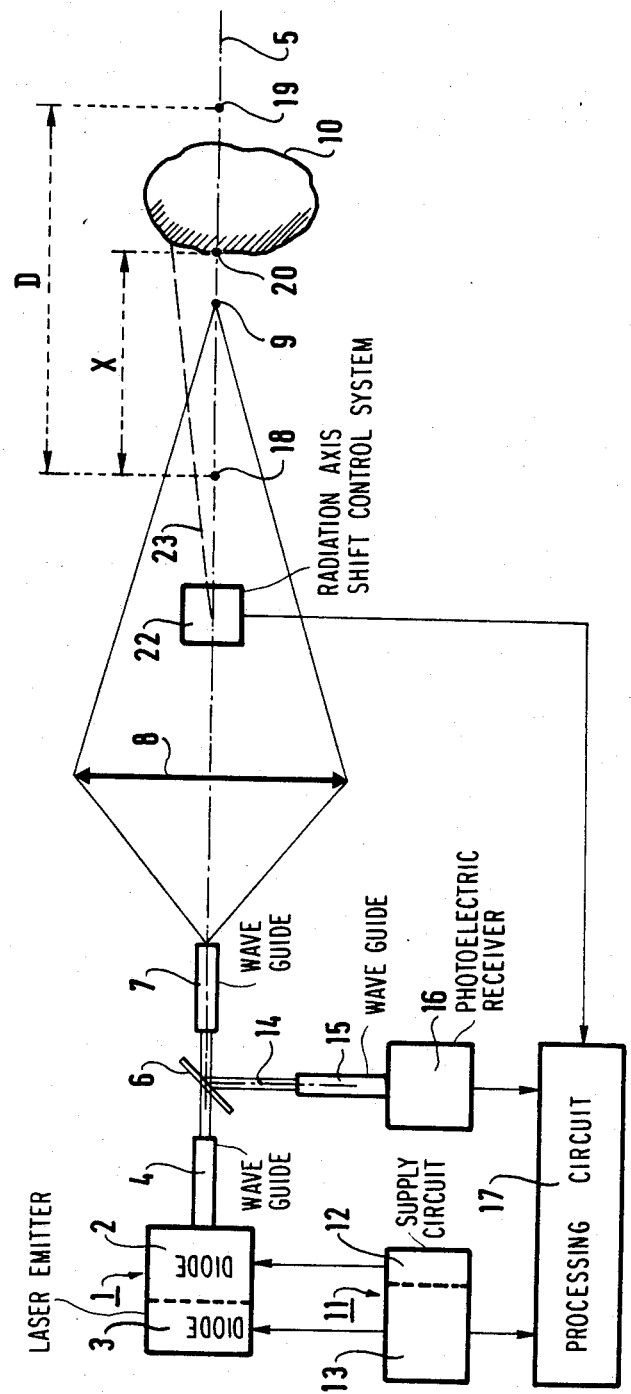

OPTICAL SYSTEM FOR DETERMINING AN OBJECT'S POSITION

FIELD OF THE INVENTION

The present invention consists of an optical system for determining an object's position.

BACKGROUND OF THE INVENTION

An optical system for determining an object's position is known of the type comprising
a laser frequency generator,
an emission convergent optical system installed at the generator output to direct the generator frequency towards the object along at least one axis,
a photoelectronic receiver sensitive to laser radiation,
a receiver optical system to direct some of the laser frequency that the object diffuses towards the receiver,
and a processing circuit connected to the receiver's electric output.

This type of system is described in the French patent application published 24th Dec. 1982 under number 2508160. In such a system, the receiver is installed along an average reception axis intersecting the axis of the emission optical system near the object whose position is to be determined. The receiver comprises at least two photoelectric measuring detectors which deliver electric signals when the object approaches the system. The system also consists of a photoelectric control detector positioned towards the object. The processing circuit is fitted with a logic circuit capable of selecting one of the signals delivered by the measurement detectors to take the necessary measurement. The processing circuit also comprises a divider circuit designed to determine the ratio between the amplitude of the electric signal delivered by the measurement detector described and the amplitude of the electric signal delivered by the control detector. Finally, it incorporates a computing circuit able to determine the distance separating the object from the system from the measured ratio.

The system outlined above have two disadvantages.

It is relatively complex. Furthermore, it is difficult to use it for determining several points of the object and therefore for detecting the form and surface of the object.

The present invention aims to overcome these disadvantages.

SUMMARY OF THE INVENTION

It consists of an optical system for determining the position of an object, of the type specified above. Its features are as follows:
the generator is equipped with a laser transmitter with controllable beam frequency,
the system also is equipped to modulate the laser transmitter's frequency as a function of time according to a predetermined law; this emission optical system is chromatic and is capable of focusing the laser's radiation in a concentrated area on the axis; the said law is predetermined to ensure displacement versus time of the concentrated area along the said axis in the direction of the object; the surface of the object transmits to the reception optical system a luminous signal once the concentrated radiation beam area encounters the surface; the receiver delivers an electric signal once it picks up the luminous signal,
the processing circuit is connected to the modulation equipment to shift the laser emitter frequency; it comprises a timer for measuring the time interval between the beginning of the frequency shift and the moment when the receiver delivers the electric signal; this time interval reflects the position of the said concentrated area when the object's surface intercepts this area.

Several special variants of the present invention are outlined below by way of examples. They are referenced to the attached drawings.

BRIEF DESCRIPTION OF THE DRAWINGS

FIG. 1 gives a schematic view of one type of system assembly based on the present invention.

DESCRIPTION OF THE PREFERRED EMBODIMENTS

Figure 2A:
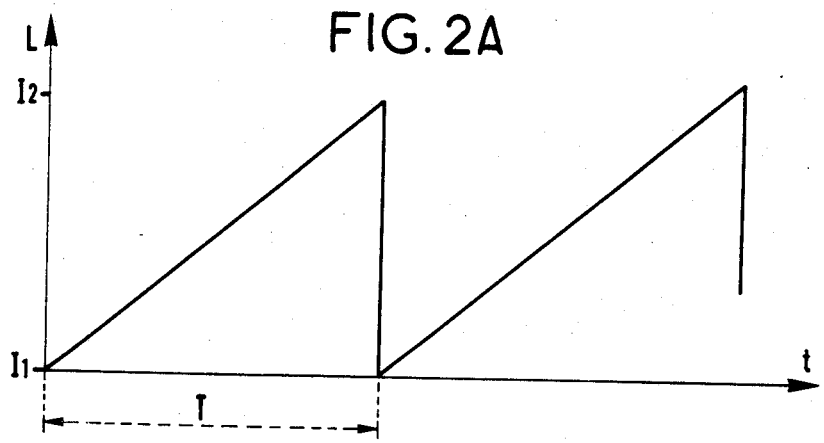
FIGS. 2A, 2B and 2C are diagrams which illustrate the operation of the system shown in FIG. 1,
FIG. 3 gives a schematic and partial view of another type of system assembly based on the present invention.

FIG. 1 shows a laser emitter or transmitter 1 with controllable beam frequency of the type described in the article entitled "High speed direct single-frequency modulation with large tuning rate and frequency excursion in cleaved-coupled-cavity semiconductor lasers" (W. T. Tsang and others) taken from the American journal "Applied Physics Letters", volume 42, no. 8 of 15th Apr. 1983, pages 650 to 652. The laser emitter 1 is a semi-conductor component equipped with electronic frequency control; it consists of two coupled diodes 2 and 3 which function as laser and modulator respectively. The laser beam transmitted by laser emitter 1 is first channelled in a wave guide 4 along an axis 5, then it crosses a partially reflecting optical strip 6 inclined at an angle of 45 degrees on axis 5. Once the laser energy has penetrated, strip 6 is channelled along axis 5 in an another wave guide before it is picked up on an emission convergent optical system 8 which concentrates it at a point 9 located on axis 5 close to an object 10 whose position is to be determined. A supply circuit 11 comprises two parts, 12 and 12, which are connected to diodes 2 and 3 respectively.

Strip 6 is located in an end plane in contrast to the plane shown in FIG. 1 so as to transmit the laser energy propagated along axis 5 and originating from object 10 along axis 14 located in the plane shown in FIG. 1. This energy is channelled in a wave guide 15 along axis 14 towards the sensitive surface of a photoelectric receiver 16. The electric output of receiver 16 and part 13 of circuit 11 are connected to a processing circuit 17.

The system outlined above and shown in FIG. 1 functions as follows:

Part 12 of supply circuit 11 delivers a steady current to diode 2 while part 13 of circuit 11 delivers an attenuated sequence of increasing linear current ramps to diode 3 (which functions as modulator).

FIG. 2A shows the shift versus time t of the intensity I supplied by circuit 13 to diode 3; the current intensity I varies between the extreme values $I_1$ and $I_2$ in each ramp.

Figure 2B:
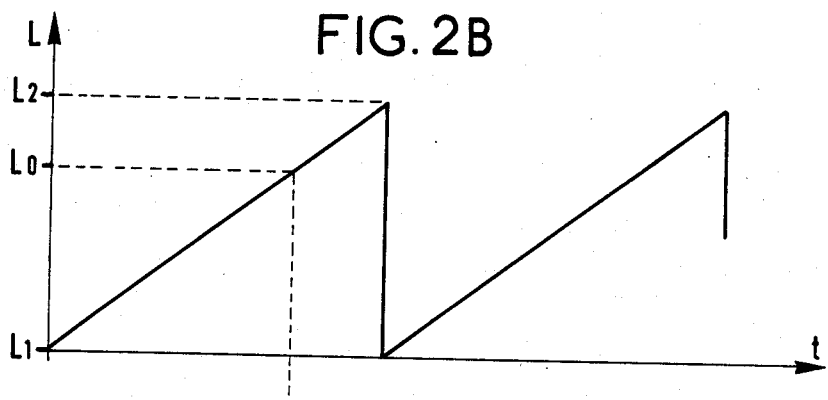

We know that under these conditions the wavelength L of the beam transmitted by laser emitter varies in proportion to the current intensity I between the limits $L_1$ and $L_2$ as indicated on the diagram in FIG. 2B, in which the time is given on the x axis on the same scale as that in FIG. 2A.

Optical system 8 comprises a chromatic slide, for example in glass, the refraction index of which varies according to the beam wavelength which penetrates it. Optical system 8 concentrates the radiation frequency of laser emitter 1 at a concentrated point 9 whose position on axis 5 varies according to the wavelength, from point 18, located between lens 8 and point 9, to point 19, located beyond object 10; point 18 corresponds to the minimal wave length $L_1$; point 19 corresponds to the maximum wavelength $L_2$.

When the current intensity I increases from $I_1$ to $I_2$, the laser energy concentration point shifts to axis 5 of point 18 towards object 10 which it encounters at point 20 along its surface. At this instant, the concentrated laser energy is diffused by the object's surface. Part of this energy forming a luminous signal crosses in the opposite direction optical system 8 and wave guide 7, and is then reflected along axis 14 by the partially reflecting strip 6. After penetration of wave guide 15, the luminous signal is picked up by photoelectric receiver 16 which responds by delivering an electric signal.

Figure 2C:
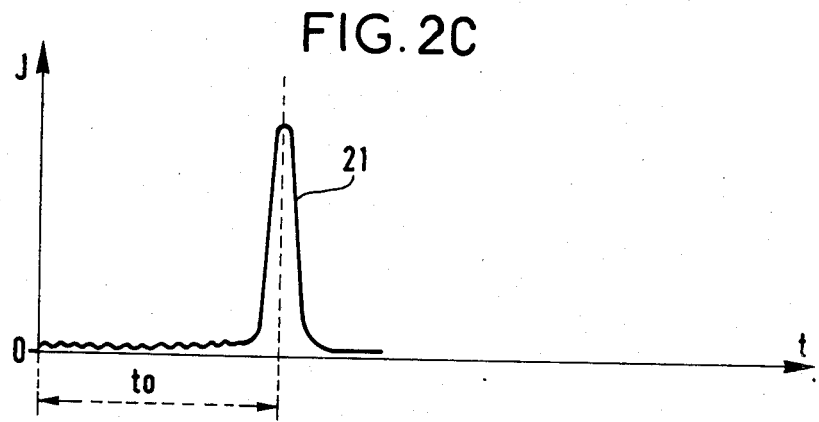

FIG. 2C is a diagram which shows the shift in amplitude J of the electric current delivered by receiver 16 according to time t; the time scale is identical to that given on diagrams 2A and 2B. It can be seen one diagram 2C that receiver 16 delivers an electric signal 21 at time $t_o$.

Time $t_o$ corresponds to the instant at which the laser energy concentration point reaches the surface of the object. By referring to FIG. 2B it may be seen that the instant $t_o$ corresponds to a wavelength $L_o$ of the laser beam between $L_1$ and $L_2$.

However, it is known that the distance D between points 18 and 19 is covered by the concentration point at a time equal to duration T of a current ramp. Consequently the distance X between point 18 and point 20 (see FIG. 1) is given by the following expression:

$$X + D(t_o/T)$$

Processing circuit 17 comprises a timer capable of measuring time $t_o$ and deduces from it the value of X.

The value X reflects the position of point 20 on axis 5 in relation to the system, since the distance between point 18 and slide 8 of this system is known.

The measurement just described is carried out for each current ramp delivered by circuit 13. When object 10 shifts in relation to the system, for example by gradually drawing closer to the system along axis 5, a sequence of information is obtained over a period of time; this sequence of information reflects the position of object 10 while it shifts.

In some cases it is necessary to obtain information on the position of a point of the object's surface and on the position of different points in order to detect the form of this surface. This is done by adding to the system described above a system 22 capable of controlling a systematic shift of axis 5. This system is assembled between lens 8 and object 10 so that the shifted axis 23 sweeps the surface of object 10. System 22 may be equipped with mirrors whose position is controlled by motors. Such a system may cause line sweeping similar to that of a television camera. In the example described above, circuit 13 causes a continuous frequency (or wavelength) modulation of the beam transmitted by laser emitter (1). Such modulation may also be ensured by means of pulses where each continuous current ramp shown in FIG. 2A appears in the form of a discrete sequence of aligned points so as to form a succession of laser energy concentration points which gradually draw closer to the object's surface.

It should be noted that the concentration "points" are in effect small almost cylindrical volumes centered on axis 5. The axial dimension of these volumes is equal to:

$$L/A^2,$$

where A is the angle under which is visible the slide 8 of point 9.

For information, laser emitter 1 transmits radiation at a wavelength of one micron beam 8 at a diameter of 3 cm; the distance between point 9 and the beam is one meter. Under these conditions, the axial dimension of the concentration volume, which indicates the system's sensitivity, is one mm. If we assume that it is possible to shift the wavelength of the laser to within a range of 0.015 microns, as stated in the American article already quoted, the distance between points 18 and 19 (see FIG. 1) is ten centimeters.

When laser emitter 1 transmits a sequence of luminous pulses of increasing wavelength, the professional can easily determine the rate of pulses to ensure that the successive concentration volumes obtained are juxtaposed without any common parts between them.

For information, to obtain the form of an object with a volume contained inside a sphere ten centimeters in diameter it is necessary, in the numerical example given above, to provide a time T of current ramps (see FIG. 2A) of $10^{-7}$ seconds to detect the form of the object in one second; the laser emitter power equals about 1 mw and the sweeping frequency is 1,000 Hertz.

It is possible to design electro-mechanical systems cabable of performing equally fast sweepings.

Figure 3:
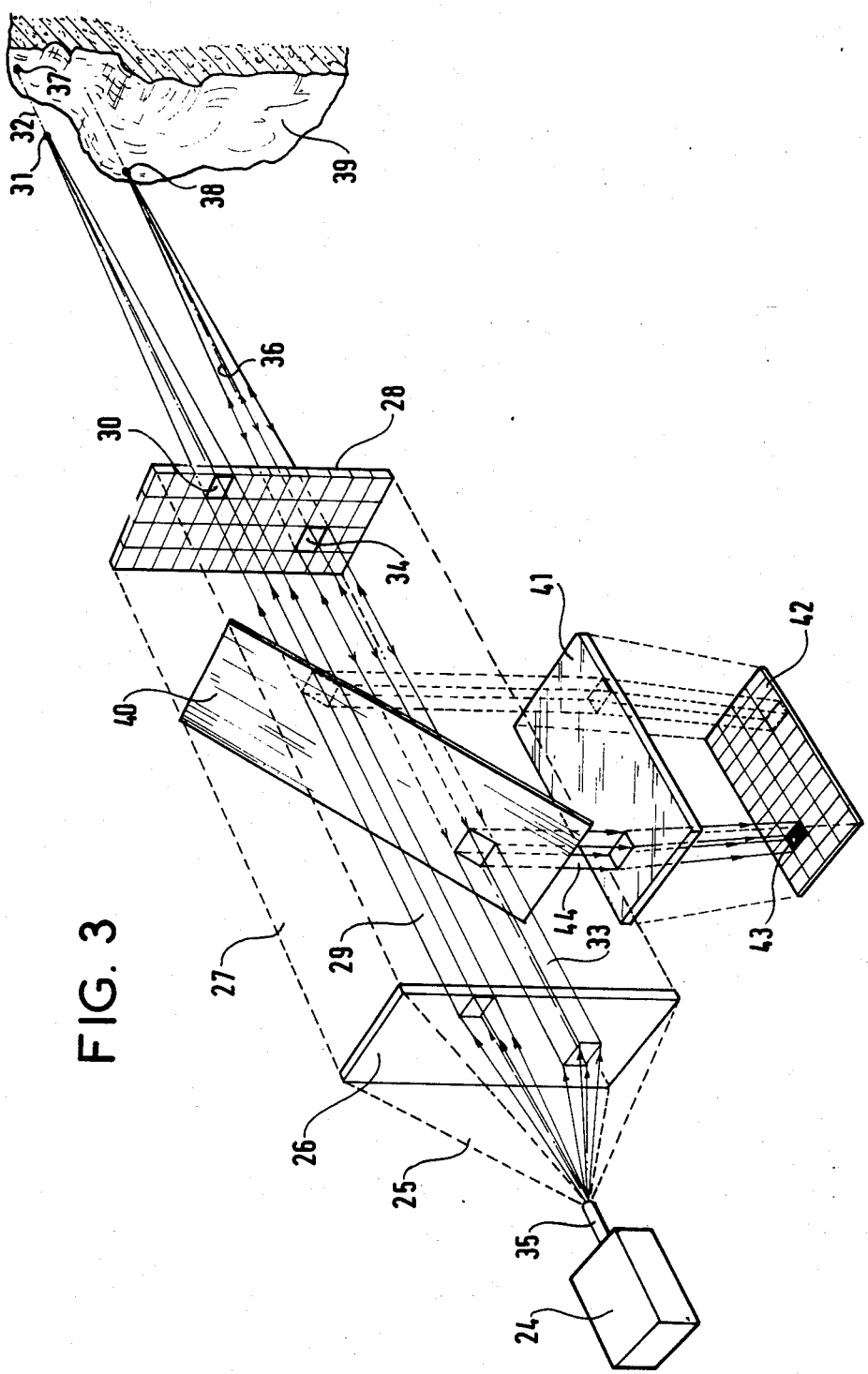

FIG. 3 shows another system based on the present invention which is capable of detecting the form of a object: this system has the advantages of consisting only of fixed parts. FIG. 3 shows a laser emitter 24 of the controllable frequency type, connected to a supply circuit (not shown) similar to circuit 11 of FIG. 1. An optical wave guide 35 is positioned at the output of laser emitter 24. The divergent beam 35 is picked up by a rectangular section lens 26 to form a parallel beam 27. An optical system 28 comprising a rectangular network of n number of identical convergent lenses picks up beam 27. In this way section 29 of beam 27 penetrates lens 30 of network 28 before being concentrated at a point 31 situated on axis 32. Axis 32 intersects at a point 37 the surface of an object 39 whose position is to be determined; point 37 is beyond point 31. Section 33 of beam 27 penetrates lense 34 before being concentrated at a point 38 situated on axis 36; point 38 is just inside axis 36 with object 39.

The lenses which equip optical system 28 are chromatic. They may comprise a glass panel whose refraction index varies with the length of the beam which pentrates them. When the wavelength of laser emitter 24 increases along curve 2B, each concentration point shifts along the object's surface along axies 32 and 36. When the concentration point situated on axis 36 reaches point 38, the object'surface transmits a luminous signal which penetrates the lens 34 in the opposite direction and is transmitted at right angles by a semi reflecting slide 40 positioned between lense 26 and network 28. Transmitted beam 44 is concentrated by a different lense 41 on detector 43 of a photoelectric receiver 42 consisting of a mosaic of n number of detectors. Each detector, for example 43, of mosaic 42 is thus coupled to a lense, for example 34, of lens network 28.

Lenses 26 and 41 are achromatic; they are equipped with a glass panel whose refraction index does not vary with the wavelength of the beam which penetrates them.

The laser generator supply circit 24 and the electrical output of the the detectors network 42 are connected to a processing circuit. This circuit calculates for each detector of mosaic 42 the time between the beginning of the shift in laser generator frequency and the instant when the detector delivers the electric signal in response to the luminous signal that it picks up. These different time reflect the distance between the system and various points on the surface of object 39. Such a system is able to measure the position of 100 points on the surface of an object positioned 30 centimeters away. The system shown in FIG. 3 has the advantages of being designed using collective fabrication techniques at a relatively small cost price.

The sytem based on the present invention may be used in such a specific field as robotics.

We claim:

1. In an optical system for determining an object's position, comprising:
   a laser frequency generator,
   a convergent optical emission system arranged at the generator output to direct the laser radiation towards the object along at least one axis,
   a photoelectric receiver sensitive to the laser radiation,
   an optical reception system directing a part of the laser radiation diffused by the object towards said receiver,
   and a processing circuit connected to said receiver and receiving said receiver electrical output,
   the improvement wherein;
   the generator comprises; a laser transmitter laser having a controllable radiation frequency,
   and said system comprises; means for varying the laser transmitter frequency in relation to time according to a predetermined law; said convergent optical emission system is chromatic and includes means for focusing the laser radiation in a concentration point situated on said axis 5; said law being such as to move the concentration point along said axis towards the object in relation to time, the object's surface sending back a light signal to said optical reception system when the concentration point impinges on said surface; the receiver issuing an electrical signal when it receives a light signal; said optical system further comprising means connecting the processing circuit to said means for varying the laser frequency including a clock to measure the time interval between the beginning of the laser transmitter frequency variation and the instant when the receiver issues the electric signal, such that said time interval is representative of the position of said laser radiation concentration point when the object's surface intercepts said concentration point.

2. The optical system according to claim 1, wherein the optical reception system comprises a partly reflecting optical strip inclined on said axis and arranged between the generator and the convergent optical emission system to transmit to the photoelectric receiver the light signal when it passes through the convergent optical emission system.

3. The optical system according to claim 1, wherein said means for varying the laser frequency in relation to time comprises means for increasing the laser radiation wavelength linearly in relation to time.

4. The optical system according to claim 1, wherein said means for varying the laser transmitter frequency in relation to time comprises means for forming a succession of laser radiation concentration points for impingement onto the object's surface along said axis gradually in relation to time.

5. The optical system according to claim 1, further comprising controllable means provided between the convergent optical emission system and the object for deflecting said axis of said laser radiation concentration points; and means for connecting said controllable means to said processing circuit; whereby, a scanning of the object's surface is effected by deflection of said axis of said laser radiation concentration points.

6. The optical system according to claim 2, further comprising achromatic optical means provided between the generator and the optical strip, said achromatic optical means being capable of forming a parallel beam covering one area of the object surface, a network of n convergent lenses concentrating the laser radiation in concentration points along n axes, and wherein the receiver comprises a mosaic of n photodetectors, each of said photodetectors being coupled to a respective network lens so that any one photodetector receives, after reflection on the optical strip, the light signal sent back by the portion of said area which intercepts the laser radiation concentration point concentrated by the lens coupled to said photodetector.

7. The optical system according to claim 1, wherein the laser transmitter is of the semi-conductor type and electronic frequency control type.

* * * * *